(12) United States Patent
Zhang et al.

(10) Patent No.: US 12,479,945 B2
(45) Date of Patent: Nov. 25, 2025

(54) CROSSLINKED POLYMERS OF ETHYLENE AND MONOCYCLIC ORGANOSILOXANE AND PROCESS

(71) Applicants: Dow Global Technologies LLC, Midland, MI (US); Dow Silicones Corporation, Midland, MI (US)

(72) Inventors: Kainan Zhang, Shanghai (CN); Yabin Sun, Shanghai (CN); Jeffrey M. Cogen, Collegeville, PA (US); Timothy J. Person, Collegeville, PA (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 412 days.

(21) Appl. No.: 18/007,231

(22) PCT Filed: Jul. 29, 2020

(86) PCT No.: PCT/CN2020/105393
§ 371 (c)(1),
(2) Date: Jan. 27, 2023

(87) PCT Pub. No.: WO2022/021114
PCT Pub. Date: Feb. 3, 2022

(65) Prior Publication Data
US 2023/0303749 A1    Sep. 28, 2023

(51) Int. Cl.
    C08F 255/02    (2006.01)
    C08G 77/42     (2006.01)
    C08K 5/14      (2006.01)
    C08K 5/3492    (2006.01)

(52) U.S. Cl.
    CPC ............ C08F 255/02 (2013.01); C08G 77/42 (2013.01); C08K 5/14 (2013.01); C08K 5/34924 (2013.01)

(58) Field of Classification Search
    CPC ......... C08F 255/02; C08G 77/42; C08K 5/14; C08K 5/34924
    USPC ....................................................... 524/100
    See application file for complete search history.

(56) References Cited

U.S. PATENT DOCUMENTS

| | | | |
|---|---|---|---|
| 3,859,247 A | 1/1975 | MacKenzie, Jr. | |
| 3,946,099 A | 3/1976 | MacKenzie, Jr. | |
| 4,005,254 A * | 1/1977 | MacKenzie, Jr. | C08F 255/02 174/110 PM |
| 4,376,180 A | 3/1983 | Turbett et al. | |
| 6,685,520 B1 | 2/2004 | Wiggins | |
| 6,743,862 B2 | 6/2004 | Hakuta et al. | |
| 7,977,429 B2 | 7/2011 | Nagai et al. | |
| 10,435,495 B2 | 10/2019 | Jang et al. | |
| 11,261,272 B2 | 3/2022 | Zhang et al. | |
| 11,459,411 B2 | 10/2022 | Sun et al. | |
| 11,472,896 B2 | 10/2022 | Yang et al. | |
| 11,485,839 B2 | 11/2022 | Yang et al. | |
| 2015/0376314 A1 | 12/2015 | Jang et al. | |
| 2020/0199270 A1 | 6/2020 | Zhang et al. | |
| 2020/0199309 A1 | 6/2020 | Yang et al. | |
| 2020/0199340 A1 | 6/2020 | Sun et al. | |
| 2020/0347213 A1 | 11/2020 | Yang et al. | |
| 2023/0002523 A1 | 1/2023 | Yang et al. | |

FOREIGN PATENT DOCUMENTS

| | | | |
|---|---|---|---|
| CN | 1178819 A | 4/1998 | |
| CN | 102234361 A | 11/2011 | |
| CN | 105273116 A * | 1/2016 | ............ C08F 212/10 |
| CN | 109553775 A | 4/2019 | |
| CN | 110770288 A * | 2/2020 | ............ C08F 210/02 |
| GB | 1277378 A | 6/1972 | |
| WO | 2019/232668 A1 | 12/2019 | |
| WO | 2020/139993 A1 | 7/2020 | |
| WO | 2021/126671 A1 | 6/2021 | |

* cited by examiner

*Primary Examiner* — Kelechi C Egwim
(74) *Attorney, Agent, or Firm* — Boyle Fredrickson S.C.

(57) ABSTRACT

Disclosed is a process includes providing (A) an ethylene/MOCOS copolymer composed of (i) units derived from ethylene, (ii) from 0.01 wt % to 0.5 wt % units derived from a comonomer, and (iii) optionally units derived from a termonomer. The comonomer is a monocyclic organosiloxane (MOCOS) of formula (I) $[R^1, R^2SiO_{2/2}]_n$ wherein n is an integer greater than or equal to 3, each $R^1$ is independently a $(C_2-C_4)$ alkenyl or a $H_2C=C(R^{1a})-C(=O)-O-(CH_2)_m-$ wherein $R^{1a}$ is H or methyl; m is an integer from 1 to 4; and each $R^2$ is independently H, $(C_1-C_4)$ alkyl, phenyl, or $R^1$. The process includes mixing (B) a free radical initiator with (A) the ethylene/MOCOS copolymer to form a mixture, heating the mixture, and forming a crosslinkable ethylene/MOCOS copolymer composition having a gel content greater than 70%.

15 Claims, No Drawings

CROSSLINKED POLYMERS OF ETHYLENE AND MONOCYCLIC ORGANOSILOXANE AND PROCESS

BACKGROUND

Polyethylene is the most widely used thermoplastic material today. In some applications, it is necessary to modify polyethylene in order to enhance certain properties. For example, crosslinking among polymer chains forms a three-dimensional (3D) network that improves heat resistance, providing crosslinked polyethylene with a higher operation temperature. Peroxide curing is widely used in industry to crosslink polyethylene. For example, crosslinkable polyethylene (XLPE) is widely used as insulation material for medium voltage (MV), high voltage (HV) and extra high voltage (EHV) wire and cable applications which is composed of low density polyethylene (LDPE), peroxide, and antioxidant. In wire and cable applications, an inner semi-conductive layer, XLPE insulation layer, and outer semi-conductive layer are typically coated onto a conductor through a crosshead in a triple extrusion process. The cable core composed of conductor, inner semi-conductive layer, XLPE insulation layer and outer semi-conductive layer subsequently passes through a vulcanization tube having 10 bar $N_2$ pressure to initiate peroxide crosslinking. After cooling by passing through a cooling tube, the cable core is placed into a chamber at elevated temperature (70° C. for example) to remove the byproducts decomposed from the peroxide.

The art therefore recognizes the need for LDPE with improved peroxide curing which yields improved productivity by increasing curing rate and reduces peroxide loading (and reduces by-product). Thus, the art further recognizes the need for LDPE with improved peroxide curing response not only for XLPE insulation applications but also for other peroxide crosslinkable compositions.

SUMMARY

The present disclosure provides a process. In an embodiment, the process includes providing (A) an ethylene/MOCOS copolymer composed of (i) units derived from ethylene, (ii) from 0.01 wt % to 0.5 wt % units derived from a comonomer, and (iii) optionally units derived from a termonomer. The comonomer is a monocyclic organosiloxane (MOCOS) of formula (I)

$[R^1,R^2SiO_{2/2}]_n$ wherein n is an integer greater than or equal to 3,
each $R^1$ is independently a ($C_2$-$C_4$)alkenyl or a $H_2C$=C($R^{1a}$)—C(=O)—O—$(CH_2)_m$—
wherein $R^{1a}$ is H or methyl;
m is an integer from 1 to 4; and
each $R^2$ is independently H, ($C_1$-$C_4$)alkyl, phenyl, or $R^1$.

The process includes mixing (B) a free radical initiator with (A) the ethylene/MOCOS copolymer to form a mixture. The process includes heating the mixture, and forming a crosslinkable ethylene/MOCOS copolymer composition. In an embodiment, the process includes crosslinking the crosslinkable ethylene/MOCOS copolymer composition to form a crosslinked ethylene/MOCOS copolymer composition having a gel content greater than 70%.

The present disclosure provides a composition. In an embodiment, a crosslinkable composition is provided and includes A) an ethylene copolymer composed (i) units derived from ethylene, (ii) from 0.01 wt % to 0.5 wt % units derived from a comonomer, and (iii) optionally units derived from a termonomer. The comonomer is a monocyclic organosiloxane (MOCOS) of formula (I)

$[R^1,R^2SiO_{2/2}]_n$ wherein n is an integer greater than or equal to 3,
each $R^1$ is independently a ($C_2$-$C_4$)alkenyl or a $H_2C$=C($R^{1a}$)—C(=O)—O—$(CH_2)_m$—
wherein $R^{1a}$ is H or methyl;
m is an integer from 1 to 4; and
each $R^2$ is independently H, ($C_1$-$C_4$)alkyl, phenyl, or $R^1$; and (B) a free radical initiator. After crosslinking, the crosslinkable composition forms a crosslinked ethylene/MOCOS copolymer composition having a gel content greater than 70%.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure).

The numerical ranges disclosed herein include all values from, and including, the lower and upper value. For ranges containing explicit values (e.g., from 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

An "acrylate" as used herein, is a monomer containing the Structure (A) below:

Structure (A)

wherein $R_1$ is a hydroxyl group or a $C_1$-$C_{18}$ alkoxy group and $R_2$ is H or $CH_3$. Acrylate-based monomers include acrylates and methacrylates.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

The term "ethylene monomer," or "ethylene," as used herein, refers to a chemical unit having two carbon atoms with a double bond there between, and each carbon bonded to two hydrogen atoms, wherein the chemical unit polymerizes with other such chemical units to form an ethylene-based polymer composition.

A "hydrocarbon" is a compound containing only hydrogen atoms and carbon atoms. A "hydrocarbonyl" (or "hydrocarbonyl group") is a hydrocarbon having a valence (typically univalent). A hydrocarbon can have a linear structure, a cyclic structure, or a branched structure.

The term "linear low density polyethylene," (or "LLDPE") as used herein, refers to a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

The term "low density polyethylene," (or LDPE) as used herein, refers to a polyethylene having a density from 0.910 g/cc to less than 0.940 g/cc, or from 0.918 g/cc to 0.930 g/cc, and long chain branches with a broad molecular weight distribution (MWD)—i.e., "broad MWD" from 4.0 to 20.0.

An "olefin" is an unsaturated, aliphatic hydrocarbon having a carbon-carbon double bond.

The term "phenyl" (or "phenyl group") is a C6H5 aromatic hydrocarbon ring having a valence (typically univalent).

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Density is measured in accordance with ASTM D792, Method B. Results are reported in grams per cubic centimeter (g/cc).

Fourier Transform Infrared Analysis ("FTIR")

Determination of the amount of terminal and internal trans double bonds per 1000 carbons (or "1000 C") was done by Fourier Transform Infrared analysis ("FTIR"). Sample films (approximately 250-300 microns in thickness) used for FTIR analysis were compression molded by pressing approximately 0.5 g of pellets of the sample in a Carver hydraulic press with heated platens set to 190° C. The amount of terminal alkenes and internal alkenes per 1000 carbons were measured following a procedure similar to the one outlined in ASTM method D6248. FTIR measures internal alkene bonds in the trans configuration, internal alkene bonds in the cis configuration are not detectable by FTIR.

Gel Content

Gel content was measured according to ASTM D 2765-01. Samples were hand cut into small pellets (about 1 mm×1 mm×1 mm cubic) from a 1 mm thickness polymer plaque which was prepared on a hot press (preheating at 120° C. for 10 minutes (min) followed by 180° C./10 MPa for 20 min, then 10 min cooling to room temperature (RT) under 10 megapascals (MPa) pressure. The samples were refluxed in xylene for 12 hours (h). After 6 h, the hot xylene was removed, and new fresh xylene was then added in for continuous refluxing for another 6 hours. Gel content results are reported in percent (%). Higher gel content indicates higher crosslink level.

Gel Permeation Chromatography (GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene (CAS 120-82-1, HPLC grade from Fisher Scientific) and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ\ 1)$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.375 to 0.440) was made to correct for column resolution and band-broadening effects such that a homopolymer polyethylene standard with a molecular weight of 120,000.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPD)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$Mz_{(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation. is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate(nominal)} * (RV(FM\ Calibrated)/RV(FM\ Sample)) \quad (EQ\ 7)$$

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym.

Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are be calculated according to Equations 8-9 as follows:

$$Mn_{(Abs)} = \frac{\sum_i IR_i}{\sum_i (IR_i / M_{Absolute\,i})} \quad \text{(EQ 8)}$$

$$Mz_{(Abs)} = \frac{\sum_i (IR_i \times M_{Absoluta}^2)}{\sum_i (IR_i * M_{Absoluta})} \quad \text{(EQ 9)}$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (10) and (11):

$$M_{PE} = (K_{PS}/K_{PE})^{1/\alpha PE-1} \cdot M_{PS}^{\alpha PS+1/\alpha PE+1} \quad \text{(Eq. 10)}$$

$$[\eta]_{PE} = K_{PS} \cdot M_{PS}^{\alpha+1} / M_{PE} \quad \text{(Eq. 11)}.$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equation (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (12):

$$IV_w = \frac{\sum_i c_i IV_i}{\sum_i c_i} = \frac{\sum_i \eta_{sp_i}}{\sum_i c_i} = \frac{\text{Viscometer Area}}{\text{Conc. Area}} \quad \text{(Eq. 12)}$$

where $\eta_{sp_i}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume:

$$[\eta]_{cc} = \frac{\sum_i c_i IV_{i,cc}}{\sum_i c_i} = \frac{\sum_i c_i K(M_{i,cc})^a}{\sum_i c_i} \quad \text{(Eq. 13)}$$

Equation (14) is used to determine the gpcBR branching index:

$$gpcBR = \left[\left(\frac{[\eta]_{cc}}{[\eta]}\right)\left(\frac{M_w}{M_{w,cc}}\right)^{\alpha_{PE}} - 1\right] \quad \text{(Eq. 14)}$$

wherein $[\eta]$ is the measured intrinsic viscosity, $[\eta]_{cc}$ is the intrinsic viscosity from the conventional calibration, Mw is the measured weight average molecular weight, and $\text{Mw}_{,cc}$ is the weight average molecular weight of the conventional calibration. The weight average molecular weight by light scattering (LS) is commonly referred to as "absolute weight average molecular weight" or "Mw, Abs." The Mw,cc using conventional GPC molecular weight calibration curve ("conventional calibration") is often referred to as "polymer chain backbone molecular weight," "conventional weight average molecular weight," and "$\text{Mw}_{,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.391, respectively, for polyethylene, and 0.722 and −3.993, respectively, for polystyrene. These polyethylene coefficients were then entered into Equation 13.

Once the K and a values have been determined using the procedure discussed previously, the procedure is repeated using the branched samples. The branched samples are analyzed using the final Mark-Houwink constants obtained from the linear reference as the best "cc" calibration values are applied.

The interpretation of gpcBR is straight forward. For linear polymers, gpcBR calculated from Equation (14) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Hot Creep

Conditions from ICE 60811-2-1, section 9.1 were followed. Dumb-bell bar specified in FIG. 12 in IEC 60811-1-1 were cut out from 1 mm thick crosslinked compression molded plaques. The dumb-bell bar were tested after 20 min at 200° C. for hot creep under a 20 N/cm² load. Hot creep measures the extension under load with results reported in percent (%). The values are indicative of extent of cross-linking with lower number indicating higher crosslinking levels.

Melt Index

The term "melt index," or "MI" as used herein, refers to the measure of how easily a thermoplastic polymer flows when in a melted state. Melt index, or $I_2$, is measured in accordance by ASTM D 1238, Condition 190° C./2.16 kg, and is reported in grams eluted per 10 minutes (g/10 min). The I10 is measured in accordance with ASTM D 1238, Condition 190° C./10 kg, and is reported in grams eluted per 10 minutes (g/10 min).

Moving Die Rheometer (MDR) Test

MDR test was conducted on MDR2000 (Alpha Technologies) at 180° C. for 20 minutes while monitoring change in torque according to ASTM D5289-12, Standard Test Method for Rubber Property-Vulcanization Using Rotorless Cure Meters. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. Determine the T90 crosslinking time as being the number of minutes required to achieve a torque value equal to 90% of the difference MH minus ML (MH–ML), i.e., 90% of the way from ML to MH. The shorter the T90 crosslinking time, i.e., the sooner the torque value gets 90% of the way from ML to MH, the faster the curing rate of the test sample. Conversely, the longer the T90 crosslinking time, i.e., the more time the torque value takes to get 90% of the way from ML to MH, the slower the curing rate of the test sample.

Nuclear Magnetic Resonance ($^1$H NMR)

The term "nuclear magnetic resonance," or "NMR" or "Proton NMR," as used herein, refers to a spectral analysis of a material or compound that provides information regarding the chemical composition and structure of the material or compound. Samples for proton NMR were prepared using 0.1-0.2 g sample in 3.25 g of 30/70 wt/wt o-dichlorobenzene-d4/perchloroethylene (ODCB-d4/PCE) containing 0.001 M Chromium(III) acetylacetonate, $Cr(AcAc)_3$, prepared in a 10 mm tube. The samples were heated and vortexed at 115° C. to ensure homogeneity. Single pulse proton spectra were acquired on a Bruker AVANCE 600 MHz spectrometer equipped with a Bruker high-temperature CryoProbe and a sample temperature of 120° C. Spectra were acquired with ZG pulse P1=20 us (90° PW), 64 scans, AQ 1.82s, $D_1$ 15 s.

Determination of the amount of Si—$CH_3$ per 1000 carbons and Si—CH=$CH_2$ (interchangeably referred to as "Si-vinyl") groups per 1000 carbons was performed by $^1$H NMR spectrum obtained as described above. The total polymer protons were quantitated by integrating from about −0.5 ppm to 3 ppm, and this integral is set to a value of 2000, and thus represents 1000 carbons. The signal from the three Si-vinyl protons appear as three separate multiplets from about 5.8 ppm to 6.1 ppm. The $(D^{Vi})_4$ multiplet nearest 5.8 ppm partially overlaps one of the LDPE chain-end vinyl protons at about 5.76 ppm. Therefore only the two multiplets at about 5.92 ppm and 6.02 ppm are integrated and averaged to give moles of Si-vinyl per 1000 carbons.

DETAILED DESCRIPTION

1. Process

The present disclosure provides a process. In an embodiment, the process includes providing (A) an ethylene/MOCOS copolymer. The ethylene/MOCOS copolymer includes (i) units derived from ethylene, (ii) from 0.01 wt % to 0.5 wt % units derived from a comonomer, and (iii) optionally units derived from a termonomer. The comonomer is a monocyclic organosiloxane (MOCOS) of formula (I)

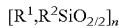

wherein n is an integer greater than or equal to 3,
each $R^1$ is independently a $(C_2\text{-}C_4)$alkenyl or a $H_2C=C(R^{1a})\text{—}C(=O)\text{—}O\text{—}(CH_2)_m\text{—}$
wherein $R^{1a}$ is H or methyl;
m is an integer from 1 to 4; and
each $R^2$ is independently H, $(C_1\text{-}C_4)$alkyl, phenyl, or $R^1$.
The process includes mixing (B) a free radical initiator with (A) the ethylene/MOCOS copolymer to form a mixture. The process includes heating the mixture for a period of time, and forming a crosslinkable ethylene/MOCOS copolymer composition.

In an embodiment, the process includes heating the crosslinkable composition at a curing temperature for a period of time, and forming a crosslinked ethylene/MOCOS copolymer composition having a gel content greater than 70%.

The process includes providing an ethylene/MOCOS copolymer. The ethylene/MOCOS copolymer is an ethylene-based polymer and includes (i) units derived from ethylene, (ii) units derived from a comonomer, and (iii) optionally units derived from a termonomer. The comonomer is a monocyclic organosiloxane (MOCOS) of formula (I)

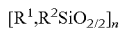

wherein n is an integer greater than or equal to 3,
each $R^1$ is independently a $(C_2\text{-}C_4)$alkenyl or a $H_2C=C(R^{1a})\text{—}C(=O)\text{—}O\text{—}(CH_2)_m\text{-}$
wherein $R^{1a}$ is H or methyl,
m is an integer from 1 to 4, and
each $R^2$ is independently H, $(C_1\text{-}C_4)$alkyl, phenyl, or $R^1$.
The ethylene-based polymer with monocyclic organosiloxane (MOCOS) of formula (I) is interchangeably referred to as "ethylene/MOCOS copolymer", and when a termonomer is present the ethylene-based polymer with monocyclic organosiloxane (MOCOS) of formula (I) is interchangeably referred to as "ethylene/MOCOS/terpolymer," wherein the units of ethylene constitute a majority amount (wt %) of the monomers present in the polymer. In other words, the ethylene-based polymer composition includes ethylene monomer, MOCOS comonomer (and optional termonomer) each of the two monomers (or each of the three monomers when the termonomer is present) polymerized into the polymer backbone. In this way, the present ethylene/MOCOS copolymer (and/or ethylene/MOCOS/termpolymer) is structurally distinct compared to a polyethylene with a functional coagent grafted pendant to the polymer chain. Weight percent of the MOCOS comonomer is based on the total weight of the ethylene/MOCOS copolymer (or total weight of the ethylene/MOCOS/terpolymer when the termonomer is present).

In addition to ethylene, the ethylene/MOCOS copolymer includes units derived from a comonomer. The comonomer is a monocyclic organosiloxane of formula (I) $[R^1,R^2SiO_{2/2}]_n$ (interchangeably referred to as "MOCOS" or "MOCOS comonomer"), formula (I) being a molecule containing a single ring substructure composed of silicon and oxygen atoms disposed in an alternating arrangement; and formula (I) containing unsaturated organo (hydrocarbonyl) groups; and optionally hydrogen ("H"), saturated substituent groups or aromatic substituent groups. At least two unsaturated organo groups and each of at least two silicon atoms in the ring substructure have at least one unsaturated organo group bonded thereto and wherein after accounting for the unsaturated organo groups and oxygen atoms, any remaining valences of the silicon atoms are bonded to the hydrogen atom, saturated substituent groups, or aromatic substituent groups; or collection of such molecules.

The MOCOS may be a monocyclic organosiloxane composed of a 6-member ring (n=3), an 8-member ring (n=4), a 10-member ring (n-5), or a 12-member ring (n=6). The ring substructure is composed of units of formula (I):

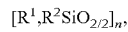

wherein n is an integer greater than or equal to 3, or n is 3, or 4 to 5, or 6,
each $R^1$ is independently a $(C_2\text{-}C_4)$alkenyl or a $H_2C=C(R^{1a})\text{—}C(=O)\text{—}O\text{—}(CH_2)_m\text{-}$, wherein $R^{1a}$ is H or methyl,
each $R^2$ is independently H, $(C_1\text{-}C_4)$alkyl, phenyl, or $R^1$ (as defined above). In each $[R^1,R^2SiO_{2/2}]$ unit, the $R^1$ group and the $R^2$ group is bonded to its respective silicon atom. The units may be designated using conventional organosiloxane shorthand notations simply as $D^{R1,R2}$ such that formula (I) becomes $[D^{R1,R2}]_n$. $R^1$ and $R^2$ can be the same or different.

Nonlimiting examples of suitable compounds for MOCOS of formula (I) include: $R^1$ is vinyl and $R^2$ is ethyl for MOCOS shorthand designation $D^{Vi,Et}$ wherein Vi is vinyl and Et is ethyl; $R^1$ is allyl and $R^2$ is ethyl for MOCOS shorthand designation $D^{Allyl,Et}$; $R^1$ is butenyl ($H_2C=C(H)CH_2CH_2$—) and $R^2$ is ethyl for MOCOS shorthand designation $D^{Butenyl,Et}$; $R^1$ is vinyl and $R^2$ is vinyl for MOCOS shorthand designation $D^{Vi,Vi}$; $R^1$ is allyl and $R^2$ is allyl for MOCOS shorthand designation $D^{Allyl,Allyl}$; $R^1$ is butenyl ($H_2C=C(H)CH_2CH_2$—) and $R^2$ is butenyl for MOCOS shorthand designation $D^{Butenyl,Butenyl}$; $R^1$ is vinyl and $R^2$ is phenyl for MOCOS shorthand designation $D^{Vi,Ph}$ wherein Ph is phenyl; $R^1$ is allyl and $R^2$ is phenyl for MOCOS shorthand designation $D^{Allyl,Ph}$; $R^1$ is butenyl ($H_2C=C(H)CH_2CH_2$—) and $R^2$ is phenyl for MOCOS shorthand designation $D^{Butenyl,Ph}$.

When $R^2$ is methyl ($CH_3$), the unit may be designated more simply as $D^{R1}$ such that formula (I) becomes $[D^{R1}]_n$. Further nonlimiting examples of suitable compounds for MOCOS of formula (I) include: $R^1$ is vinyl and $R^2$ is methyl for MOCOS shorthand designation $D^{Vi}$; $R^1$ is allyl and $R^2$ is methyl for MOCOS shorthand designation $D^{Allyl}$; $R^1$ is butenyl ($H_2C=C(H)CH_2CH_2$—) and $R^2$ is methyl for MOCOS shorthand designation $D^{Butenyl}$.

In an embodiment, MOCOS of formula (I) each $R^1$ is independently $H_2C=C(R^{1a})\text{—}C(=O)\text{—}O\text{—}(CH_2)_m\text{—}$ wherein $R^{1a}$ is H or methyl, and subscript m is an integer from 1, or 2 to 3 or to 4, and any range or individual value therein. In a further embodiment, each $R^2$ is independently $(C_1\text{-}C_2)$alkyl or $(C_2\text{-}C_3)$alkenyl; or each $R^2$ is independently $(C_1\text{-}C_2)$alkyl; or each $R^2$ is independently methyl.

In an embodiment, MOCOS of formula (I) is 2,4,6-trimethyl-2,4,6-trivinyl-cyclotrisiloxane, "$(D^{Vi})_3$," (CAS No. 3901-77-7) having Structure (B) below:

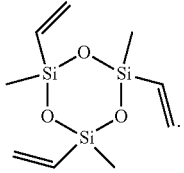

Structure (B)

In an embodiment, MOCOS of formula (I) is 2,4,6,8-tetramethyl-2,4,6,8-tetravinyl-cyclotetrasiloxane, "$(D^{Vi})_4$" (CAS No. 2554-06-5), having Structure (C) below:

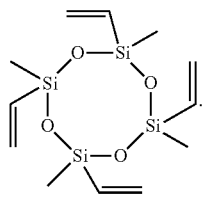

In an embodiment, MOCOS of formula (I) is 2,4,6,8,10-pentamethyl-2,4,6,8,10-pentavinyl-cyclopentasiloxane, $(D^{Vi})_5$.

The MOCOS comonomer of formula (I) is present in the ethylene-based polymer in an amount from 0.01 wt % to 2 wt %, or from 0.01 wt % to 0.5 wt %, or from 0.05 wt % to 0.45 wt %, or from 0.1 wt % to 0.40 wt %, or from 0.3 wt % to 0.5 wt %, or from 0.15 wt % to 0.30 wt %, or from 0.05 wt % to 0.15 wt %. Weight percent is based on total weight of the ethylene-based polymer composition, namely, the ethylene/MOCOS copolymer.

In addition to the ethylene and the MOCOS comonomer, the ethylene/MOCOS copolymer includes optional units derived from a termonomer and is an ethylene/MOCOS/terpolymer. When present, the termonomer is an olefin, an unsaturated ester, a functionalized alkene, silane, and combinations thereof. Nonlimiting examples of suitable termonomer (when the termonomer is present) include propylene, $C_4$-$C_8$ alpha-olefin, acrylate, (meth)acrylate, vinyl acetate, vinyltrimethoxysilane, and combinations thereof. When the termonomer is present in the ethylene-based polymer, the termonomer is present in an amount from 0.5 wt % to 50 wt %, or from 1 wt % to 40 wt %, or from 1 wt % to 30wt %, or from 1 wt % to 25wt %, or from 1 wt % to 20wt % , or from 1 wt % to 15wt %, or from 3 wt % to 12 wt %, or from 5 wt % to 10 wt %. Weight percent is based on the total weight of the ethylene/MOCOS/terpolymer. S In an embodiment, the present ethylene-based polymer composition includes the ethylene/MOCOS copolymer of formula (I) and also includes a termonomer of formula (II)

[$R^1,R^2SiO_{2/2}$]$_n$   formula (II)

wherein n is an integer greater than or equal to 3,
each $R^1$ is independently a methyl group, a ($C_2$-$C_4$) alkenyl or a $H_2C=C(R^{1a})$—$C(=O)$—$O$—$(CH_2)_m$— with the proviso at least two $R^1$'s are not a methyl group,
wherein $R^{1a}$ is H or methyl,
m is an integer from 1 to 4, and
each $R^2$ is independently H, ($C_1$-$C_4$)alkyl, phenyl, or $R^1$.

In an embodiment, the ethylene/MOCOS copolymer (and/or the ethylene/MOCOS/terpolymer) may be a component in an ethylene-based polymer composition that includes one or more optional additives. When the additive is present, nonlimiting examples of suitable additives include stabilizers, light stabilizers, UV absorbers, antioxidants, plasticizers, antistatic agents, voltage stabilizers, crosslinking coagents and scorch retardants, pigments, dyes, carbon black, nanoparticles, nucleating agents, fillers, slip agents, fire retardants, processing aids, smoke inhibitors, viscosity control agents and anti-blocking agents. The ethylene-based polymer composition may, for example, include less than 70 percent of the combined weight of one or more additives and fillers, based on the weight of the ethylene-based polymer composition.

In an embodiment, the ethylene-based polymer composition is compounded with one or more antioxidants. Nonlimiting examples of suitable antioxidants include bis(4-(1-methyl-1-phenylethyl)phenyl)amine (e.g., NAUGARD 445); 2,2-methylene-bis(4-methyl-6-t-butylphenol) (e.g., VANOX MBPC); 2,2'-thiobis(2-t-butyl-5-methylphenol (CAS No. 90-66-4), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-dimethylphenyl)methyl]-1,3,5-triazine-2, 4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis (1,1-dimethylethyl)-4-hydroxybenzenepropanoic acid 2,2'-thiodiethanediyl ester (e.g., IRGANOX 1035, CAS Number 41484-35-9); distearylthiodipropionate ("DSTDP"); dilaurylthiodipropionate (e.g., IRGANOX PS 800); stearyl 3-(3, 5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024); 4,4-thiobis(2-t-butyl-5-methyiphenoi) (also known as 4,4'-thiobis(6-tert-butyl-m-cresol); 2,2'-thiobis(6-t-butyl-4- methylphenol; tris[(4-tert-butyl-3-hydroxy-2,6-dimethylphenyl)methyl]-1,3,5-triazine-2,4,6-trione; distearylthiodipropionate; and combinations thereof. The antioxidant is present from 0.01 wt % to 1.5 wt %, or from 0.05 wt % to 1.2 wt %, or from 0.07 wt % to 1.0 wt %, or from 0.1 wt % to 0.5wt %, based on the total weight of the ethylene-based composition. The ethylene-based polymer composition is treated with the antioxidant(s) before the heating step.

In an embodiment, the ethylene-based polymer composition is an ethylene/MOCOS copolymer consisting of (i) ethylene and (ii) from 0.05 wt % to 0.5 wt % MOCOS copolymer selected from $(D^{Vi})_3$, $(D^{Vi})_4$, and $(D^{Vi})_5$, the ethylene/MOCOS copolymer having a Mw/Mn from 5.0 to 9.5, or from 7.5 to 9.5, a vinyls content from 0.3600/1000 carbon atoms to 0.6200/1000 carbon atoms, a trans content from 0.1000/1000 carbon atoms to 0.3100/1000 carbon atoms, and a MI from 2.0 g/10 min to 5.0 g/10 min.

In an embodiment, the ethylene-based polymer composition is an ethylene/MOCOS copolymer consisting of (i) ethylene and (ii) from 0.05 wt % to 0.5 wt % $(D^{Vi})_4$, the ethylene/MOCOS copolymer composition having one, some, or all of the following properties:
(i) a Mw/Mn from 5.0 to 9.5 or from 7.5 to 9.5; and/or
(ii) a vinyls content from 0.3600/1000 carbon atoms to 0.6200/1000 carbon atoms; and/or
(iii) a trans content from 0.1000/1000 carbon atoms to 0.3100/1000 carbon atoms; and/or (iv) a MI from 2.0 g/10 min to 5.0 g/10 min, or from 2.5 g/10 min to 4.7 g/10 min.

In an embodiment, the ethylene-based polymer composition is an ethylene/MOCOS copolymer consisting of (i) ethylene and (ii) from 0.1 wt % to 0.5 wt % MOCOS copolymer selected from $(D^{Vi})_4$, the ethylene/MOCOS copolymer having a Mw/Mn from 7.0 to 7.5, a vinyls content from 0.5800/1000 carbons to 0.6200/1000 carbons, a trans content from 0.2000/1000 carbon atoms to 0.2500/1000 carbon atoms, and a MI from 35.0 g/10 min to 42.0 g/10 min.

In an embodiment, the ethylene-based polymer composition is an ethylene/MOCOS/MA terpolymer consisting of (i) ethylene, (ii) from 0.01 wt % to 0.5 wt % MOCOS and (iii) from 1 wt % to 50 wt % MA, or from 8 wt % to 12 wt % MA. Weight percent based on total weight of the ethylene/MOCOS/MA terpolymer.

The process includes mixing (B) a free radical initiator with (A) the ethylene/MOCOS copolymer to form a mixture. In an embodiment, the free radical initiator is an organic peroxide. The organic peroxide is a molecule containing carbon atoms, hydrogen atoms, and two or more oxygen atoms, and having at least one —O-group, with the proviso that when there are more than one —O—O-groups, each —O—O-group is bonded indirectly to another —O—O-group via one or more carbon atoms, or collection of such molecules. Nonlimiting examples of suitable organic peroxide include diacylperoxides, peroxycarbonates, peroxydicarbonates, peroxyesters, peroxyketals, cyclic ketone peroxides, dialkylperoxides, ketone peroxides, and combinations thereof.

The organic peroxide may be a monoperoxide of formula $R^O$—O—O—$R^O$, wherein each $R^O$ independently is a ($C_1$-$C_{20}$) alkyl group or ($C_6$-$C_{20}$) aryl group. Each ($C_1$-$C_{20}$) alkyl group independently is unsubstituted or substituted with 1 or 2 ($C_6$-$C_{12}$) aryl groups. Each ($C_6$-$C_{20}$) aryl group is unsubstituted or substituted with 1 to 4 ($C_1$-$C_{10}$) alkyl groups. Alternatively, the organic peroxide may be a diperoxide of formula $R^O$—O—O—R—O—O—$R^O$, wherein R is a divalent hydrocarbon group such as a ($C_2$-$C_{10}$) alkylene, ($C_3$-$C_{10}$) cycloalkylene, or phenylene, and each $R^O$ is as defined above.

Nonlimiting examples of suitable organic peroxides include dicumyl peroxide; lauryl peroxide; benzoyl peroxide; tertiary butyl perbenzoate; di (tertiary-butyl) peroxide; cumene hydroperoxide; 2,5-dimethyl-2,5-di(t-butyl-peroxy) hexyne-3; 2,-5-di-methyl-2,5-di (t-butyl-peroxy) hexane; tertiary butyl hydroperoxide; isopropyl percarbonate; alpha, alpha'-bis (tertiary-butylperoxy) diisopropylbenzene; t-butylperoxy-2-ethylhexyl-monocarbonate; 1,1-bis (t-butylperoxy) -3,5,5-trimethyl cyclohexane; 2,5-dimethyl-2,5-dihydroxyperoxide; t-butylcumylperoxide; alpha, alpha'-bis (t-butylperoxy)-p-diisopropyl benzene; bis (1,1-dimethylethyl) peroxide; bis (1,1-dimethylpropyl) peroxide; 2,5-dimethyl-2, 5-bis (1,1-dimethylethylperoxy) hexane; 2,5-dimethyl-2,5-bis (1,1-dimethylethylperoxy) hexyne; 4,4-bis (1,1-dimethylethylperoxy) valeric acid; butyl ester; 1,1-bis (1,1-dimethylethylperoxy)-3,3,5-trimethylcyclohexane; benzoyl peroxide; tert-butyl peroxybenzoate; di-tert-amyl peroxide ("DTAP"); bis (alpha-t-butyl-peroxyisopropyl) benzene ("BIPB"); isopropylcumyl t-butyl peroxide; t-butylcumylperoxide; di-t-butyl peroxide; 2,5-bis (t-butylperoxy)-2,5-dimethylhexane; 2,5-bis (t-butylperoxy)-2,5-dimethylhexyne-3,1,1-bis (t-butylperoxy)-3,3,5-trimethylcyclohexane; isopropylcumyl cumylperoxide; butyl 4,4-di (tert butylperoxy) valerate; di (isopropylcumyl) peroxide; and the like.

Nonlimiting examples of suitable commercially available organic peroxides include TRIGONOX from AkzoNobel and LUPEROX from Arkema.

In an embodiment, the free radical initiator is an organic peroxide that is dicumyl peroxide (DCP).

Mixing of the ethylene/MOCOS copolymer (A) and the free radical initiator (B) occurs by placing pellets of the ethylene/MOCOS copolymer and the free radical initiator into a container and optionally with antioxidant(s). The container is subsequently shaken, rotated, tumbled, or otherwise agitated so that the free radical initiator contacts and is retained by, or otherwise the free radical initiator is absorbed into, the pellets of ethylene/MOCOS copolymer. The process includes heating the mixture of (A) the ethylene/MOCOS copolymer and (B) the free radical initiator at a temperature from 60° C., or 65° C. to 70° C., or 75° C., or 80° C., or otherwise heating at a temperature greater than the melting temperature of peroxide. Heating of the mixture occurs for a duration from 1 minute, or 10 minutes, or 30 minutes to 1 hour, or 2 hours, or 3 hours, or 4 hours, or 5 hours, or 6 hours, or 7 hours, or 8 hours, thereby enabling the free radical initiator to diffuse into the ethylene/MOCOS copolymer pellets.

In an embodiment, the mixing and the heating occur sequentially.

In an embodiment, the mixing and the heating occur simultaneously.

The process includes crosslinking (interchangeably referred to as "curing") the crosslinkable ethylene/MOCOS copolymer composition, and forming a crosslinked ethylene/MOCOS copolymer composition having a gel content greater than 70%. In an embodiment, the crosslinked ethylene/MOCOS copolymer has a gel content from 71%, or 75%, or 80% to 85%, or 90%, or 95%, or 99%. In a further embodiment, the crosslinked ethylene/MOCOS copolymer has a gel content from 71% to 99%, or from 72% to 95%, or from 73 to 90%.

The curing step (crosslinking step) includes heating the crosslinkable ethylene/MOCOS copolymer composition at a curing temperature from greater than 100° C., or 110° C., or 125° C. to 150° C., or 180° C., or 200° C. for a duration from 1 minute, or 5 minutes, or 10 minutes, or 30 minutes, or 1 hour to 2 hours, or 5 hours, or 7 hours, or more to form the crosslinked ethylene/MOCOS copolymer composition having a gel content from 71% to 99%, or from 72% to 95%, or from 73 to 90%.

Crosslinking of the ethylene/MOCOS copolymer may be accomplished by a procedure that does not utilize peroxide initiator. In an embodiment, the process includes subjecting the ethylene/MOCOS copolymer to irradiation and forming a crosslinked ethylene/MOCOS copolymer having a gel content greater than 70%. The irradiation can be electron beam irradiation (E-beam), ultraviolet (UV) irradiation, photo initiation, and combinations thereof. In this embodiment, the mixing step and the heating step described are eliminated and replaced with the irradiation step. The crosslinked ethylene/MOCOS copolymer has a gel content a gel content greater than 70%, or from 71%, or 75%, or 80% to 85%, or 90%, or 95%, or 99%. In a further embodiment, the crosslinked ethylene/MOCOS copolymer has a gel content from 71% to 99%, or from 72% to 95%, or from 73 to 90%.

In an embodiment, the process includes mixing from 3 wt % to 0.05 wt % of the free radical initiator (B) with from 97 wt % to 99.95 wt % of the ethylene/MOCOS copolymer (A). The process includes heating the mixture at a temperature from 70° C. to 90° C. and forming a crosslinkable ethylene/MOCOS copolymer. The process includes curing the crosslinkable ethylene/MOCOS copolymer composition and forming a crosslinked ethylene/MOCOS copolymer composition having a T90 less than 5 minutes, or a T90 from 3.0 minutes to 4.9 minutes and a gel content from 71% to 99% after curing.

In an embodiment, the process includes mixing from 1.5 wt % to 0.5 wt % of the free radical initiator (B) with from 98.5 wt % to 99.5 wt % of an ethylene/MOCOS copolymer (A). The ethylene/MOCOS copolymer (A) has from 0.3 wt % to 0.5 wt % units derived from the MOCOS comonomer (based on total weight of the ethylene/MOCOS copolymer). The process includes heating the mixture at a temperature from 70° C. to 90° C. for 0.5 to 8 hr and forming a crosslinkable ethylene/MOCOS copolymer composition. The process includes curing the crosslinkable ethylene/MOCOS copolymer composition to form a crosslinked ethylene/MOCOS copolymer composition having a gel content from 71% to 99%, and a hot creep elongation from 20% to 50%

In an embodiment, the process includes mixing from 1.5 wt % to 0.5 wt % of the free radical initiator (B) with from 98.5 wt % to 99.5 wt % of an ethylene/MOCOS copolymer (A). The ethylene/MOCOS copolymer has from 0.05 wt % to 0.2 wt % units derived from the MOCOS comonomer (based on total weight of the ethylene/MOCOS copolymer). The process includes heating the mixture at a temperature from 70° C. to 90° C. for 2 to 6 hr, and forming a crosslinkeable ethylene/MOCOS copolymer composition. The process includes curing the crosslinkable ethylene/MOCOS copolymer composition to form a crosslinked ethylene/MOCOS copolymer composition having a gel content from 71% to 99% and having a hot creep elongation from 50% to 90%.

In an embodiment, the process includes mixing from 3 wt % to 0.3 wt % of the free radical initiator (B), with from 97 wt % to 99.7 wt % of the ethylene/MOCOS copolymer (A) and 0.05 wt % to 0.3 wt % one or more antioxidants (yielding 100 wt % of a crosslinkable ethylene-based polymer composition). The process includes heating the mixture at a temperature from 70° C. to 90° C. for 2 to 6 hr and forming a crosslinkable ethylene-based polymer composition. After curing, a crosslinked ethylene/MOCOS copolymer composition is formed having
(1) a gel content from 64% to 99% and a T90 from 3.0 minutes to 5.3 minutes, or
(2) a gel content from 71% to 99% and a T90 less than 5 minutes, or a T90 from 3.0 minutes to 4.9 minutes.

2. Composition

The present disclosure provides a composition that is a crosslinkable ethylene-based polymer composition. A "crosslinkable ethylene-based polymer composition," as used herein, is a composition containing an ethylene-based polymer and one or more additives (a free radical initiator or organic peroxide, for example) that enhance the ethylene-based polymer's ability to crosslink when subjected to crosslinking conditions (e.g., heat, irradiation, and/or UV light). After being subjected to the crosslinking conditions (e.g., "after crosslinking" or "after curing"), the crosslinkable ethylene-based polymer composition becomes a "crosslinked ethylene-based polymer composition" that is structurally and physically distinct to the crosslinkable ethylene-based polymer composition.

In an embodiment, the crosslinked ethylene-based composition is formed by the peroxide initiation process as previously disclosed herein.

In an embodiment, a crosslinkable ethylene-based polymer composition is provided and includes (A) an ethylene copolymer composed of (i) units derived from ethylene, (ii) from 0.01 wt % to 0.5 wt % units derived from a comonomer, and (iii) optionally units derived from a termonomer. The comonomer is a monocyclic organosiloxane (MOCOS) of formula (I)

wherein n is an integer greater than or equal to 3,
each $R^1$ is independently a $(C_2\text{-}C_4)$alkenyl or a $H_2C=(R^{1a})\text{—}C(=O)\text{—}O\text{—}(CH_2)_m\text{—}$
wherein $R^{1a}$ is H or methyl;
m is an integer from 1 to 4; and
each $R^2$ is independently H, $(C_1\text{-}C_4)$alkyl, phenyl, or $R^1$ (ethylene/MOCOS copolymer). The crosslinkable ethylene-based polymer composition also includes (B) a free radical initiator. The crosslinkable ethylene/MOCOS copolymer composition, after crosslinking, forms a crosslinked ethylene/MOCOS copolymer having a gel content greater than 70%. In an embodiment, the crosslinkable ethylene/MOCOS copolymer composition has a gel content from 71%, or 75%, or 80% to 85%, or 9%, or 95%, or 99%. In a further embodiment, the crosslinked ethylene/MOCOS copolymer composition has a gel content from 71% to 99%, or from 72% to 95%, or from 73 to 90%.

In an embodiment, the MOCOS comonomer for the ethylene/MOCOS copolymer is selected from 2,4,6-trimethyl-2,4,6-trivinyl-cyclotrisiloxane $(D^{Vi})_3$, 2,4,6,8-tetramethyl-2,4,6,8-tetravinyl-cyclotetrasiloxane $(D^{Vi})_4$, 2,4,6,8,10-pentamethyl-2,4,6,8,10-pentaivinyl-cyclotrisiloxane $(D^{Vi})_5$, and combinations thereof.

In an embodiment, the MOCOS comonomer for the ethylene/MOCOS copolymer is $(D^{Vi})_4$. The crosslinked ethylene/MOCOS copolymer composition contains from 0.01 wt % to 0.5 wt % of $(D^{Vi})_4$ (based on total weight of the ethylene/MOCOS copolymer) and the crosslinked ethylene/MOCOS copolymer composition has one, some, or all of the following properties:
(i) a Mw/Mn from 7.5 to 9.5, and/or
(ii) a vinyls content from 0.3600/1000 carbons to 0.6200/1000 carbons, and/or
(iii) a trans content from 0.1000/1000 carbon atoms to 0.3100/1000 carbon atoms.

In an embodiment, the crosslinkable ethylene-based polymer composition includes (A) from 97 wt % to 99.95 wt % of the ethylene/MOCOS copolymer; and (B) from 3 wt % to 0.05 wt % of the free radical initiator. Weight percent is based on total weight of the crosslinked ethylene/MOCOS copolymer composition.

In an embodiment, the crosslinkable ethylene-based polymer composition includes from 98.5 wt % to 99.5 wt % of an ethylene/MOCOS copolymer (A). The ethylene/MOCOS copolymer has from 0.3 wt % to 0.5 wt % units derived from the MOCOS comonomer (based on total weight of the ethylene/MOCOS copolymer). The crosslinkable ethylene-based polymer composition also includes from 1.5 wt % to 0.5 wt % of the free radical initiator (B). The crosslinkable ethylene/MOCOS copolymer composition, after crosslinking, forms a crosslinked ethylene/MOCOS copolymer composition having a gel content from 71% to 99%, or from 72% to 95%, or from 73% to 90%, and has a hot creep elongation from 20% to 50%.

In an embodiment, the crosslinkable ethylene-based polymer composition includes from 98.5 wt % to 99.5 wt % of an ethylene/MOCOS copolymer (A). The ethylene/MOCOS copolymer has from 0.05 wt % to 0.2 wt % units derived from the MOCOS comonomer (based on total weight of the ethylene/MOCOS copolymer). The crosslinkable ethylene-based polymer composition also includes from 1.5 wt % to 0.5 wt % of the free radical initiator (B). The crosslinkable ethylene/MOCOS copolymer composition, after crosslinking, forms a crosslinked ethylene/MOCOS copolymer composition having a gel content from 71% to 99%, or from 72% to 95%, or from 73% to 90% and has a hot creep elongation from 50% to 90%.

In an embodiment, the crosslinkable ethylene-based polymer composition includes from 98.5 wt % to 99.5 wt % of an ethylene/MOCOS copolymer (A). The ethylene/MOCOS copolymer has from 0.05 wt % to 0.2 wt % units derived from the MOCOS comonomer (based on total weight of the ethylene/MOCOS copolymer). The crosslinkable ethylene-based polymer composition also includes from 1.5 wt % to 0.5 wt % of the free radical initiator (B). The crosslinkable ethylene-based polymer composition includes from 0.05 wt % to 0.3 wt % of one or more antioxidants (yielding 100 wt % of the crosslinkable ethylene-based polymer composition). The crosslinkable ethylene-based polymer composition, after crosslinking, forms a crosslinked ethylene/MOCOS copolymer composition having one, some, or all of the following properties:
 (i) a gel content from 64% to 99%, or from 71% to 99%, or from 72% to 95%, or from 73% to 90%; and/or
 (ii) a T90 from 3.0 minutes to 5.3, or from 3.0 minutes to 4.9 minutes; and/or
 (iii) a hot creep elongation from 50% to 90%.

Applications

The crosslinked ethylene/MOCOS copolymer composition may be employed in a variety of applications including, but not limited to, wire and cable applications, such as an insulation layer for MV/HV/EHV cable for AC (alternating current) and DC (direct current), a semi-conductive layer filled with carbon black for MV/HV/EHV cable, an accessory for a power distribution transmission line, an insulation layer, an insulation encapsulation film for a photovoltaic (PV) module.

By way of example, and not limitation, some embodiments of the present disclosure will now be described in detail in the following examples.

EXAMPLES

Materials used in the examples are set forth in Table 1 below.

TABLE 1

| Material | Description | Source |
|---|---|---|
| LDPE control | Ethylene homopolymer LDPE1 control 4 Ml | Dow Inc. |
| | Ethylene homopolymer LDPE 12 control 40 Ml | |
| comonomer MOCOS $(D^{vi})_4$ | 2,4,6,8-tetramethyl-2,4,6,8-tetravinyl-cyclotetrasiloxane, (CAS No. 2554-06-5) 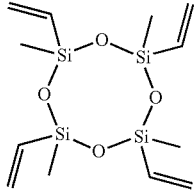 [SMILES: C=C[Si]1(C)O[Si](C)(C=C)O[Si](C)(C=C)O[Si](C)(C=C)O1] $(D^{vi})_4$ | Alfa Aesar |
| Organic peroxide | Luperox 26 t-butyl peroxy-2-ethylhexanoate | Arkema |
| | Dicumyl peroxide (DCP) | Farida, China |
| Curing coagent | Triallyl isocyanurate (TAIC) | Farida, China |
| Antioxidant | Irganox 1076 | BASF |
| Antioxidant | Cyanox 1790 | BASF |
| Antioxidant | DSTDP | Reagens, Inc. |
| Antioxidant | Uvinul 4050 | BASF |
| Propylene | chain transfer agent | Praxair |

1. Polymerization of Ethylene and MOCOS Comonomer

The amount of each material used in the samples and in the comparative samples (controls) are provided in Table 2 below. A 545 milliliter (ml) stirred autoclave is charged with a mixture of ethylene, MOCOS $((D^{vi})_4)$, propylene (as a chain transfer agent). Organic peroxide (Luperox 26) as a 0.5 wt %, 1 wt %, or 2 wt % solution in odorless mineral spirit was added as a polymerization initiator to the mixture, which was subjected to a set pressure of approximately 28,000 psi (1,969 kg/cm$^2$). Reactor temperature was set to a target temperature of 220° C. Under the polymerization conditions shown in Table 2, ethylene/MOCOS copolymers were continuously synthesized and subsequently converted into pellet forms by melt extrusion. The conditions listed in Table 2 are averages over the time span that the samples were collected. The "autoclave-made" experimental reactor copolymers thus formed were found to have the characteristics set forth in Table 3.

TABLE 2

Polymerization Conditions

| Example | Reactor Pressure (psi) | Reactor Temperature (° C.) | Ethylene feed rate (lb/hr) | $(D^{Vi})_4$ feed rate (lb/hr) | Propylene feed rate (lb/hr) | Initiator solution wt % | Initiator solution feed rate (cc/hr) | Reactor conversion (%) |
|---|---|---|---|---|---|---|---|---|
| 1 control | 28000 | 220.4 | 25.0 | 0 | 0.93 | 1.0 | 22.5 | 8.69 |
| 2 control | 27975 | 221.1 | 25.0 | 0 | 1.4 | 0.50 | 19.7 | 10.1 |
| Sample 2 | 27987 | 220.1 | 25.0 | 0.12 | 0.98 | 0.50 | 45.6 | 9.93 |
| Sample 3 | 28024 | 220.6 | 24.9 | 0.24 | 1.1 | 1.0 | 41.1 | 10.5 |
| Sample 4 | 28013 | 220.9 | 25.0 | 0.40 | 1.2 | 2.0 | 27.9 | 8.72 |
| Sample 10 | 27986 | 220.0 | 24.9 | 0.40 | 1.6 | 1.0 | 61.7 | 9.38 |
| Sample 11 | 28048 | 219.6 | 24.9 | 0.12 | 0.95 | 1.0 | 22.6 | 10.1 |
| Sample 13 | 28027 | 219.7 | 25.1 | 0.24 | 1.5 | 1.0 | 53.0 | 14.9 |

The properties of resultant ethylene/MOCOS copolymers are provided in Table 3 below.

TABLE 3

Properties for Ethylene/MOCOS Copolymer

| | $(D^{Vi})_4$* | MI target | MI measured | Vinyls+ | Trans+ |
|---|---|---|---|---|---|
| 1 control | 0.0 | 4.0 | 4.15 | 0.3500 | 0.0522 |
| 2 control | 0.0 | 40.0 | 40.46 | 0.5447 | 0.0755 |
| Sample 2 | 0.15 | 4.0 | 3.51 | 0.3837 | 0.1283 |
| Sample 3 | 0.3 | 4.0 | 3.47 | 0.4463 | 0.2043 |
| Sample 4 | 0.50 | 4.0 | 2.85 | 0.5121 | 0.2984 |
| Sample 10 | 0.50 | 40 | 14.66 | 0.6167 | 0.3008 |
| Sample 11 | 0.08 | 4.0 | 3.46 | 0.3786 | 0.1014 |
| Sample 13 | 0.30 | 40.0 | 37.25 | 0.6092 | 0.2307 |

NM = not measured,
*wt % $(D^{Vi})_4$ and wt % MA based on total weight ethylene-based polymer composition,
+Vinyls and trans are in mole %

TABLE 5

NMR data for ethylene/MOCOS copolymer

| Sample | NMR Si—$CH_3$ per 1000 carbons | NMR Si-vinyl per 1000 carbons | Conversion (amount of double bonds consumed, %) |
|---|---|---|---|
| 2 | 0.41 | 0.15 | 63.4 |
| 3 | 0.76 | 0.26 | 65.7 |
| 4 | 1.28 | 0.44 | 65.6 |
| 10 | 1.21 | 0.43 | 64.4 |
| 11 | 0.23 | 0.08 | 65.2 |
| 13 | 0.72 | 0.27 | 62.5 |

2. Crosslinked Ethylene-based Polymer Composition

For the inventive examples (IE), dicumyl peroxide (DCP) and pellets of ethylene/MOCOS copolymer (and optional

TABLE 4

GPC Properties of ethylene/MOCOS copolymer

| ID* | Conventional GPC | | | | | Absolute GPC | | | | | | Mw (Abs) (GPC) |
|---|---|---|---|---|---|---|---|---|---|---|---|---|
| | Mn | Mw | Mz | Mp | Mw/Mn | Mn | Mw | Mz (BB) | Mz (abs) | Mz + 1 (BB) | Mz/Mw | Mw (GPC) |
| 1 control(0/4) | 11,471 | 82,089 | 410,969 | 41,675 | 7.16 | 11,976 | 182,857 | 886,632 | 6,210,161 | 1,986,555 | 33.96 | 2.23 |
| 2 control (0/40) | 9,824 | 50,535 | 235,963 | 32,082 | 5.14 | 9,163 | 89,364 | 581,899 | 3,775,070 | 1,439,047 | 42.24 | 1.77 |
| Sample 2 (0.15/4) | 11,157 | 92,663 | 578,964 | 38,805 | 8.31 | 11,742 | 217,508 | 1,076,795 | 5,248,199 | 2,253,696 | 24.13 | 2.35 |
| Sample 3 (0.30/4) | 10,975 | 102,163 | 782,298 | 35,617 | 9.31 | 10,526 | 294,562 | 1,357,367 | 7,140,095 | 2,527,086 | 24.24 | 2.88 |
| Sample 4 (0.50/4) | 9,731 | 84,220 | 635,113 | 30,984 | 8.65 | 9,018 | 230,250 | 1,176,708 | 6,549,265 | 2,396,283 | 28.44 | 2.73 |
| Sample 10 (0.50/40) | 9,566 | 89,026 | 795,450 | 27,402 | 9.31 | 9,040 | 303,637 | 1,357,442 | 8,346,058 | 2,315,738 | 27.49 | 3.41 |
| Sample 11 (0.08/4) | 11,984 | 90,702 | 528,185 | 39,741 | 7.63 | 12,089 | 213,760 | 1,033,855 | 5,597,665 | 2,163,215 | 26.19 | 2.36 |
| Sample 13- (0.30/40) | 8,997 | 64,132 | 522,051 | 25,620 | 7.13 | 8,253 | 182,120 | 1,099,960 | 7,415,758 | 2,092,632 | 40.72 | 2.84 |

*ID = Identification, wt % $(D^{Vi})_4$ is first value and MI is second value in closed parentheses Proton NMR was used to characterize degree of incorporation/conversion of the $(D^{Vi})_4$ in selected samples. The Proton NMR detects the presence of Si—$CH_3$ and Si-vinyl. On average, 2.5 double bonds per molecule of $(D^{Vi})_4$ are incorporated into the polyethylene backbone (Table 5). Bounded by no particular theory, it is believed that the copolymerization of the $(D^{Vi})_4$ with the ethylene and the incorporation of two double bonds produces H-branched structures resulting in an unexpected increase in melt strength.

antioxidant) were weighed into in a 250 mL fluoride HDPE bottle. The bottle was then shaken for about 5 seconds (s) for mixing. Then the bottle was placed in an 80° C. oven. The bottle was then taken out every 5 minutes (min) for shaking (each shaking having a duration of about 5 seconds), totally 6 times at 0 min, 5min, 10 min, 15 min, 20 min, 25 min. The bottle was then shaken 5 times and then placed in the oven for 6.5 hours. MDR was then measured.

For the comparative samples (CS), DCP, pellets of LDPE and free $(D^{Vi})_4$ were weighed into in a 250 mL fluoride HDPE bottle. The bottle was then shaken for about 5 seconds (s) for mixing. Then the bottle was placed in an 80° C. oven. The bottle was then taken out every 5 minutes (min) for shaking (each shaking having a duration of about 5 seconds), totally 6 times at 0 min, 5min, 10 min, 15 min, 20 min, 25 min. The bottle was then shaken 5 times and then placed in the oven for 6.5 hours. MDR was then measured. In the comparative samples, no bonding occurs between the $(D^{Vi})_4$ and the LDPE.

TABLE 6A crosslinked ethylene-based polymer compositions

| ID* | IE1 | CS1 | IE2 | CS2 | IE3 | CS3 | IE4 | CS4 | IE5 | CS5 | IE6 | CS6 |
|---|---|---|---|---|---|---|---|---|---|---|---|---|
| C1(0/4) | | | | | | | | | | | | |
| C2 (0/40) | | 98 | | 98.5 | | 99 | | 98.2 | | 98.7 | | 99.2 |
| sample10 (0.5/40) | 98.5 | | 99 | | 99.5 | | | | | | | |
| sample 13 (0.3/40) | | | | | | | 98.5 | | 99 | | 99.5 | |
| sample 2 (0.15/4) | | | | | | | | | | | | |
| sample11 (0.08/4) | | | | | | | | | | | | |
| sample 4 (0.5/4) | | | | | | | | | | | | |
| sample 3 (0.3/4) | | | | | | | | | | | | |
| DCP | 1.5 | 1.5 | 1 | 1 | 0.5 | 0.5 | 1.5 | 1.5 | 1 | 1 | 0.5 | 0.5 |
| vi-d4 | | 0.5 | | 0.5 | | 0.5 | | 0.3 | | 0.3 | | 0.3 |
| total | 100 | 100 | 100 | 100 | 100 | 100 | 100 | 100 | 100 | 100 | 100 | 100 |
| ML, dN*m | 0.07 | 0.02 | 0.07 | 0.01 | 0.06 | 0.01 | 0.03 | 0.02 | 0.03 | 0.02 | 0.02 | 0.01 |
| MH, dN*m | 5.29 | 4.12 | 3.94 | 2.88 | 2.71 | 1.65 | 3.71 | 3.56 | 2.79 | 2.48 | 1.63 | 1.27 |
| MH − ML, dN*m | 5.22 | 4.1 | 3.87 | 2.87 | 2.65 | 1.64 | 3.68 | 3.54 | 2.76 | 2.46 | 1.61 | 1.26 |
| T90, min. | 3.69 | 4.22 | 3.82 | 4.54 | 4.37 | 5.34 | 4.27 | 4.42 | 4.50 | 4.68 | 4.79 | 5.72 |
| gel content, % | 89 | 85 | 85 | 80 | 78 | 71 | 85 | 84 | 81 | 77 | 73 | 58 |

*ID = Identification, wt % $(D^{Vi})_4$ is first value and MI is second value in closed parentheses,
C = control,

TABLE 6B crosslinked ethylene-based polymer compositions (continued)

| ID* | IE7 | CS7 | IE8 | CS8 | IE9 | CS9 | IE10 | CS10 |
|---|---|---|---|---|---|---|---|---|
| C1 (0/4) | | 99.35 | | 98.42 | | 98.92 | | 98 |
| C2 (0/40) | | | | | | | | |
| s10 (0.5/40) | | | | | | | | |
| s13 (0.3/40) | | | | | | | | |
| s2 (0.15/4) | 99.5 | | | | | | | |
| s11 (0.08/4) | | | 98.5 | | 99 | | | |
| s4 (0.5/4) | | | | | | | 98.5 | |
| s3 (0.3/4) | | | | | | | | |
| DCP | 0.5 | 0.5 | 1.5 | 1.5 | 1 | 1 | 1.5 | 1.5 |
| vi-d4 | | 0.15 | | 0.08 | | 0.08 | | 0.5 |
| total | 100 | 100 | 100 | 100 | 100 | 100 | 100 | 100 |
| ML, dN*m | 0.17 | 0.14 | 0.19 | 0.16 | 0.17 | 0.16 | 0.2 | 0.16 |
| MH, dN*m | 2.35 | 2.3 | 4.63 | 4.55 | 3.48 | 3.14 | 6.05 | 5.71 |
| MH − ML, dN*m | 2.18 | 2.16 | 4.44 | 4.39 | 3.31 | 2.98 | 5.85 | 5.55 |
| T90, min. | 4.42 | 4.56 | 4.02 | 4.13 | 4.06 | 4.21 | 3.48 | 3.70 |
| gel content, % | 76 | 69 | 88 | 86 | 82 | 80 | 89 | 90 |

| ID* | IE11 | CS11 | IE12 | CS12 | IE13 | CS13 | IE14 | CS14 |
|---|---|---|---|---|---|---|---|---|
| C1 (0/4) | | 98.2 | | 98.5 | | 99 | | 99.2 |
| C2 (0/40) | | | | | | | | |
| s10 (0.5/40) | | | | | | | | |
| s13 (0.3/40) | | | | | | | | |
| s2 (0.15/4) | | | | | | | | |
| s11 (0.08/4) | | | | | | | | |
| s4 (0.5/4) | | | 99 | | 99.5 | | | |
| s3 (0.3/4) | 98.5 | | | | | | 99.5 | |
| DCP | 1.5 | 1.5 | 1 | 1 | 1.5 | 0.5 | 0.5 | 0.5 |
| vi-d4 | | 0.3 | | 0.5 | | 0.5 | | 0.3 |
| total | 100 | 100 | 100 | 100 | 100 | 100 | 100 | 100 |
| ML, dN*m | 0.18 | 0.16 | 0.18 | 0.15 | 0.16 | 0.14 | 0.15 | 0.14 |
| MH, dN*m | 5.32 | 5.11 | 4.73 | 4.43 | 3.33 | 3.08 | 2.69 | 2.54 |
| MH − ML, dN*m | 5.14 | 4.95 | 4.55 | 4.28 | 3.17 | 2.94 | 2.54 | 2.4 |

TABLE 6B-continued

| crosslinked ethylene-based polymer compositions (continued) | | | | | | | | |
|---|---|---|---|---|---|---|---|---|
| T90, min. | 3.73 | 3.90 | 3.63 | 3.84 | 4.01 | 4.39 | 4.29 | 4.55 |
| gel content, % | 89 | 88 | 90 | 85 | 80 | 77 | 80 | 75 |

*ID = Identification, wt % $(D^{vi})_4$ is first value and MI is second value in closed parentheses,
C = control,
S = sample Tables 6A-6B show that the ethylene/$(D^{vi})_4$ copolymer has higher crosslinking level (greater than 70% gel content) than is obtained using an equivalent amount of free $(D^{vi})_4$ (vi-d4 in data tables) as an additive to LDPE. In the Tables 6A-6B, 7A-7B, 8, and 9, side-by-side comparisons are provided whereby each inventive example containing the ethylene/$(D^{vi})_4$ copolymer with a given $(D^{vi})_4$ wt % comonomer content is paired with a comparative sample composed of LDPE and free $(D^{vi})_4$—the wt % $(D^{vi})_4$ comonomer in the inventive example being the same as, or substantially the same as, the wt % of the free $(D^{vi})_4$ in the comparative sample. Peroxide content is the same across each side-by-side comparison. For each side-by-side comparison, the inventive example has (i) a higher MH-ML value, and/or (ii) a shorter T90 time, and/or (iii) a greater percent gel content, and/or (iv) a lower hot creep value than the comparative sample.

Tables 7A-7B (below) show crosslinked compositions containing antioxidant Irganox 1076 (shown as 1076 in data tables).

TABLE 7A

| crosslinked ethylene-based polymer compositions with antioxidant | | | | | | | | | |
|---|---|---|---|---|---|---|---|---|---|
| ID* | IE15 | CS15 | IE16 | CS16 | IE17 | CS17 | IE18 | CS18 | IE19 |
| C1 (0/4) | | 98.8 | | 97.8 | | 99 | | 98.5 | |
| C2 (0/40) | | | | | | | | | |
| s10 (0.5/40) | | | | | | | | | |
| s13 (0.3/40) | | | | | | | | | |
| s2 (0.15/4) | | | | | | | | | |
| s11 (0.08/4) | | | | | | | | | |
| s4 (0.5/4) | 99.3 | | 98.3 | | | | | | |
| s3 (0.3/4) | | | | | 99.3 | | 98.8 | | 98.3 |
| DCP | 0.5 | 0.5 | 1.5 | 1.5 | 0.5 | 0.5 | 1 | 1 | 1.5 |
| Irganxo 1076 | 0.2 | 0.2 | 0.2 | 0.2 | 0.2 | 0.2 | 0.2 | 0.2 | 0.2 |
| vi-d4 | | 0.5 | | 0.5 | | 0.3 | | 0.3 | |
| total | 100 | 100 | 100 | 100 | 100 | 100 | 100 | 100 | 100 |
| ML, dN*m | 0.14 | 0.13 | 0.16 | 0.15 | 0.13 | 0.13 | 0.15 | 0.14 | 0.16 |
| MH, dN*m | 2.97 | 2.56 | 5.5 | 5.33 | 2.36 | 2.15 | 3.83 | 3.55 | 5.11 |
| MH − ML, dN*m | 2.83 | 2.43 | 5.34 | 5.18 | 2.23 | 2.02 | 3.68 | 3.41 | 4.95 |
| T90, min. | 3.98 | 4.46 | 3.64 | 3.90 | 4.23 | 4.62 | 4.02 | 4.15 | 3.83 |
| gel content, % | 76 | 72 | 88 | 88 | 72 | 68 | 82 | 79 | 87 |
| ID* | CS19 | IE20 | CS20 | IE21 | CS21 | IE22 | CS22 | IE23 | CS23 |
| C1 (0/4) | 98 | | 99.15 | | 98.65 | | 99.22 | | 98.22 |
| C2 (0/40) | | | | | | | | | |
| s10 (0.5/40) | | | | | | | | | |
| s13 (0.3/40) | | | | | | | | | |
| s2 (0.15/4) | | 99.3 | | 98.8 | | | | | |
| s11 (0.08/4) | | | | | | 99.3 | | 98.3 | |
| s4 (0.5/4) | | | | | | | | | |
| s3 (0.3/4) | | | | | | | | | |
| DCP | 1.5 | 1.5 | 0.5 | 1 | 1 | 0.5 | 0.5 | 1.5 | 1.5 |
| Irganxo 1076 | 0.2 | 0.2 | 0.2 | 0.2 | 0.2 | 0.2 | 0.2 | 0.2 | 0.2 |
| vi-d4 | 0.3 | | 0.15 | | 0.15 | | 0.08 | | 0.08 |
| total | 100 | 100 | 100 | 100 | 100 | 100 | 100 | 100 | 100 |
| ML, dN*m | 0.16 | 0.15 | 0.13 | 0.17 | 0.14 | 0.14 | 0.13 | 0.16 | 0.16 |
| MH, dN*m | 4.97 | 1.97 | 1.81 | 3.31 | 3.19 | 1.73 | 1.68 | 4.35 | 4.19 |
| MH − ML, dN*m | 4.81 | 1.82 | 1.68 | 3.14 | 3.05 | 1.59 | 1.55 | 4.19 | 4.03 |
| T90, min. | 4.03 | 4.62 | 4.73 | 4.22 | 4.44 | 4.91 | 5.09 | 4.15 | 4.30 |
| gel content, % | 87 | 68 | 60 | 80 | 77 | 66 | 55 | 85 | 84 |

*ID = Identification, wt % $(D^{vi})_4$ is first value and MI is second value in closed parentheses,
C = control,
S = sample

TABLE 7B crosslinked ethylene-based polymer compositions with antioxidant (continued)

| ID* | IE24 | CS24 | IE25 | CS25 | IE26 | CS26 | IE27 | CS27 | IE28 | CS28 | IE29 | CS29 |
|---|---|---|---|---|---|---|---|---|---|---|---|---|
| C1 (0/4) | | | | | | | | | | | | |
| C2 (0/40) | | 98.8 | | 98.3 | | 97.8 | | | | 98.5 | | 98 |
| s10 (0.5/40) | 99.3 | | 98.8 | | 98.3 | | | | | | | |
| s13 (0.3/40) | | | | | | | 99.3 | | 98.8 | | 98.3 | |
| s2 (0.15/4) | | | | | | | | | | | | |
| s11 (0.08/4) | | | | | | | | | | | | |
| s4 (0.5/4) | | | | | | | | | | | | |
| s3 (0.3/4) | | | | | | | | | | | | |
| DCP | 0.5 | 0.5 | 1 | 1 | 1.5 | 1.5 | 0.5 | 0.5 | 1 | 1 | 1.5 | 1.5 |
| Irganox 1076 | 0.2 | 0.2 | 0.2 | 0.2 | 0.2 | 3.2 | 0.2 | 0.2 | 0.2 | 0.2 | 0.2 | 0.2 |
| vi-d4 | | 0.5 | | 0.5 | | 0.5 | | 0.3 | | 0.3 | | 0.3 |
| total | 100 | 100 | 100 | 100 | 100 | 100 | 100 | 100 | 100 | 100 | 100 | 100 |
| ML, dN*m | 0.05 | 0.01 | 0.06 | 0.01 | 0.06 | 0.01 | 0.01 | 0.01 | 0.03 | 0.01 | 0.02 | 0.02 |
| MH, dN*m | 2.2 | 1.27 | 3.44 | 2.41 | 4.59 | 3.7 | 1.26 | 0.95 | 2.47 | 2.04 | 3.4 | 3.23 |
| MH – ML, dN*m | 2.15 | 1.26 | 3.38 | 2.4 | 4.53 | 3.69 | 1.25 | 0.94 | 2.44 | 2.03 | 3.38 | 3.21 |
| T90, min. | 4.41 | 5.39 | 3.99 | 4.62 | 3.87 | 4.47 | 5.24 | 5.43 | 4.51 | 4.98 | 4.40 | 4.68 |
| gel content, % | 71 | 65 | 81 | 72 | 87 | 83 | 64 | 56 | 78 | 72 | 83 | 81 |

*ID = Identification, wt % $(D^{vi})_4$ is first value and MI is second value in closed parentheses,
C = control

TABLE 8

Hot creep data for crosslinked compositions

| | IE 30 | CS 30 | IE 16 | CS 16 | IE18 | CS18 | IE 19 | CS 19 | IE 31 | CS31 | IE 23 | CS 23 |
|---|---|---|---|---|---|---|---|---|---|---|---|---|
| Control sample 1 (MI = 4) | | 98.3 | | 97.8 | | 98.5 | | 98 | | 98.15 | | 98.22 |
| 0.5% vi-d4 copolymer (Sample 4, MI = 4) | 98.8 | | 98.3 | | | | | | | | | |
| 0.3% vi-d4 copolymer (Sample 3, MI = 4) | | | | | 98.8 | | 98.3 | | | | | |
| 0.15% vi-d4 copolymer (Sample 2, MI = 4) | | | | | | | | | 98.3 | | | |
| 0.08% vi-d4 copolymer (Sample 11, MI = 4) | | | | | | | | | | | 98.3 | |
| DCP | 1 | 1 | 1.5 | 1.5 | 1 | 1 | 1.5 | 1.5 | 1.5 | 1.5 | 1.5 | 1.5 |
| Irganox 1076 | 0.2 | 0.2 | 0.2 | 0.2 | 0.2 | 0.2 | 0.2 | 0.2 | 0.2 | 0.2 | 0.2 | 0.2 |
| Vinyl D4 | | 0.5 | | 0.5 | | 0.3 | | 0.3 | | 0.15 | | 0.08 |
| TAIC | | | | | | | | | | | | |
| AO blends* | | | | | | | | | | | | |
| Total | 100 | 100 | 100 | 100 | 100 | 100 | 100 | 100 | 100 | 100 | 100 | 100 |
| Hot creep elongation % | 50 | 93 | 30 | 45 | 80 | 155 | 47 | 53 | 72 | 77 | 82 | 128 |

TABLE 9

Hot creep data for crosslinked compositions (continued)

| | IE 32 | IE 33 | IE 34 | CS 32 |
|---|---|---|---|---|
| Control Sample 1 (MI = 4) | | | | 98.35 |
| 0.15% vi-d4 copolymer (Sample 2, MI = 4) | 98.85 | 98.55 | 98.5 | |
| DCP | 0.5 | 0.3 | 0.3 | 0.3 |
| Vinyl D4 | 0.5 | 1 | 0.6 | 0.75 |
| TAIC | — | — | 0.45 | 0.45 |
| AO blend* | 0.15 | 0.15 | 0.15 | 0.15 |
| Total | 100 | 100 | 100 | 100 |
| Hot creep elongation % | 110 | 112 | 85 | 143 |
| ML, dN*m | 0.14 | 0.12 | 0.13 | 0.12 |
| MH, dN*m | 2.85 | 2.41 | 2.63 | 2.53 |
| MH – ML, dN*m | 2.71 | 2.29 | 2.50 | 2.41 |
| T90, min. | 4.40 | 5.21 | 5.25 | 5.55 |

*0.15% AO blend = antioxidant blend 0.06% Cyanox 1790, .09% DSTDP and 19 ppm of Uvinul 4050 (for aggregate 0.15 wt % based on total wt of crosslinkable ethylene-based polymer composition)

The hot creep data from Tables 8-9 (above) show that crosslinked ethylene-based polymer compositions with the ethylene/MOCOS copolymer exhibit improved hot creep performance (i.e., shorter hot creep elongation %) than the comparative samples (control formulations). The data demonstrate the advantage for using ethylene/MOCOS copolymer composition in order to achieve a desired crosslinking level.

Comparing IE34 (ethylene/(0.15 wt %) MOCOS copolymer with 0.6 wt % free $(D^{vi})_4$) to CS32 (LDPE and 0.75 wt % free ($D^{Vi}$) shows IE34 achieved better curing response with shorter T90 time (5.25 v 5.55), lower hot creep (85% v 143%), higher MH-ML (2.50 v 2.41) at the same ($D^{Vi}$)$_4$, weight percent (0.15 wt %) and same amount of DCP (0.3 wt %).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
   providing (A) an ethylene/MOCOS copolymer comprising
   (i) units derived from ethylene,
   (ii) from 0.01 wt % to 0.5 wt % units derived from a comonomer, and
   (iii) optionally units derived from a termonomer, and the comonomer is a monocyclic organosiloxane (MOCOS) of formula (I)

$[R^1,R^2SiO_{2/2}]_n$ wherein n is an integer greater than or equal to 3,
   each $R^1$ is independently a ($C_2$-$C_4$)alkenyl or a $H_2C$=C($R^{1a}$)—C(=O)—O—($CH_2$)$_m$—
   wherein $R^{1a}$ is H or methyl;
   m is an integer from 1 to 4; and
   each $R^2$ is independently H, ($C_1$-$C_4$)alkyl, phenyl, or $R^1$;
   mixing (B) a free radical initiator with (A) the ethylene/MOCOS copolymer to form a mixture;
   heating the mixture; and
   forming a crosslinkable ethylene/MOCOS copolymer composition.

2. The process of claim 1 comprising crosslinking the crosslinkable ethylene/MOCOS copolymer composition; and
   forming a crosslinked ethylene/MOCOS copolymer composition having a gel content greater than 70%.

3. The process of claim 1 comprising
   providing an ethylene/MOCOS copolymer wherein the MOCOS comonomer is selected from the group consisting of 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and combinations thereof.

4. The process of claim 1 comprising
   mixing from 3 wt % to 0.3 wt % of the free radical initiator (B) with from 97 wt % to 99.7 wt % of the ethylene/MOCOS copolymer (A);
   heating the mixture at a temperature from 70° C. to 90° C.;
   curing the crosslinkable ethylene/MOCOS copolymer composition; and
   forming a crosslinked ethylene/MOCOS copolymer composition having a T90 less than 5 minutes.

5. The process of claim 1 comprising
   mixing from 1.5 wt % to 0.5 wt % of the free radical initiator (B) with from 98.5 wt % to 99.5 wt % of an ethylene/MOCOS copolymer (A) having from 0.3 wt % to 0.5 wt % units derived from the MOCOS comonomer;
   heating the mixture at a temperature from 70° C. to 90° C.;
   forming a crosslinkable ethylene/MOCOS copolymer composition;
   curing the crosslinkable ethylene/MOCOS copolymer composition; and
   forming a crosslinked ethylene/MOCOs copolymer composition having a hot creep elongation from 20% to 50%.

6. The process of claim 1 comprising
   mixing from 1.5 wt % to 0.5 wt % of the free radical initiator (B) with from 98.5 wt % to 99.5 wt % of an ethylene/MOCOS copolymer (A) having from 0.05 wt % to 0.2 wt % units derived from the MOCOS comonomer;
   heating the mixture at a temperature from 70° C. to 90° C.; and
   forming a crosslinkable ethylene/MOCOS copolymer composition;
   curing the crosslinkable ethylene/MOCOS copolymer composition; and
   forming a crosslinked ethylene/MOCOs copolymer composition having a hot creep elongation from 50% to 90%.

7. A crosslinkable ethylene-based polymer composition comprising:
   (A) an ethylene copolymer comprising
   (i) units derived from ethylene,
   (ii) from 0.01 wt % to 0.5 wt % units derived from a comonomer,
   (iii) optionally units derived from a termonomer; and
   the comonomer is a monocyclic organosiloxane (MOCOS) of formula (I)

$[R^1,R^2SiO_{2/2}]_n$ wherein n is an integer greater than or equal to 3,
   each $R^1$ is independently a ($C_2$-$C_4$)alkenyl or a $H_2C$=C($R^{1a}$)—C(=O)—O—($CH_2$)$_m$—
   wherein $R^{1a}$ is H or methyl;
   m is an integer from 1 to 4; and
   each $R^2$ is independently H, ($C_1$-$C_4$)alkyl, phenyl, or $R^1$;
   (B) a free radical initiator; and
   the ethylene/MOCOS copolymer composition, after crosslinking, has a gel content greater than 70%.

8. The crosslinkable ethylene-based polymer composition of claim 7 wherein the MOCOS comonomer is selected from the group consisting of 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and combinations thereof.

9. The crosslinkable ethylene-based polymer composition of claim 7 comprising
   (A) from 97 wt % to 99.95 wt % of the ethylene/MOCOS copolymer; and
   (B) from 3 wt % to 0.05 wt % of the free radical initiator.

10. The crosslinkable ethylene-based polymer composition of claim 7 comprising
    from 98.5 wt % to 99.5 wt % of an ethylene/MOCOS copolymer (A) having from 0.3 wt % to 0.5 wt % units derived from the MOCOS comonomer;
    from 1.5 wt % to 0.5 wt % of the free radical initiator (B); and
    the ethylene/MOCOS copolymer composition, after crosslinking, has a hot creep elongation from 20% to 50%.

11. The crosslinkable ethylene-based polymer composition of claim 7 comprising
    from 98.5 wt % to 99.5 wt % of an ethylene/MOCOS copolymer (A) having from 0.05 wt % to 0.2 wt % units derived from the MOCOS comonomer;
    from 1.5 wt % to 0.5 wt % of the free radical initiator (B);

the ethylene/MOCOS copolymer composition, after crosslinking, has a hot creep elongation from 50% to 90%.

12. The crosslinkable ethylene-based polymer composition of claim 7 wherein the MOCOS comonomer is 2,4,6,8-tetramethyl-2,4,6,8-tetravinyl-cyclotetrasiloxane and the ethylene/MOCOS copolymer has
    (i) a Mw/Mn from 7.5 to 9.5,
    (ii) a vinyls content from 0.3600/1000 carbons to 0.6200/1000 carbons, and
    (iii) a trans content from 0.1000/1000 carbon atoms to 0.3100/1000 carbon atoms.

13. The crosslinkable ethylene-based polymer composition of claim 12 comprising an antioxidant.

14. A crosslinked ethylene-based polymer composition formed from the crosslinkable composition of claim 1.

15. An article comprising the crosslinked ethylene-based polymer composition of claim 14.

* * * * *